United States Patent
Shiizaki et al.

(10) Patent No.: US 9,059,771 B2
(45) Date of Patent: Jun. 16, 2015

(54) WIRELESS RELAY DEVICE AND WIRELESS RELAY METHOD

(71) Applicant: FUJITSU LIMITED, Kawasaki (JP)

(72) Inventors: Kotaro Shiizaki, Yokosuka (JP); Hiroyuki Seki, Kamakura (JP)

(73) Assignee: FUJITSU LIMITED, Kawasaki (JP)

( * ) Notice: Subject to any disclaimer, the term of this patent is extended or adjusted under 35 U.S.C. 154(b) by 329 days.

(21) Appl. No.: 13/655,604

(22) Filed: Oct. 19, 2012

(65) Prior Publication Data

US 2013/0040557 A1 Feb. 14, 2013

Related U.S. Application Data

(63) Continuation of application No. PCT/JP2010/003014, filed on Apr. 27, 2010.

(51) Int. Cl.
*H04B 7/14* (2006.01)
*H04B 7/155* (2006.01)

(52) U.S. Cl.
CPC .................. *H04B 7/15507* (2013.01)

(58) Field of Classification Search
CPC .................................... H04B 7/15507
USPC ........................ 455/7, 11.1, 13.1, 9
See application file for complete search history.

(56) References Cited

U.S. PATENT DOCUMENTS

| | | | | |
|---|---|---|---|---|
| 6,728,918 B1 * | 4/2004 | Ikeda et al. | ................... | 714/748 |
| 6,975,641 B1 * | 12/2005 | Kurobe et al. | ................ | 370/445 |
| 7,890,049 B2 * | 2/2011 | Chang et al. | ................ | 455/11.1 |
| 7,970,344 B2 * | 6/2011 | Horiuchi et al. | ............. | 455/11.1 |
| 2007/0081498 A1 | 4/2007 | Niwano | | |

FOREIGN PATENT DOCUMENTS

| | | |
|---|---|---|
| JP | 2001-196990 | 7/2001 |
| JP | 2001-235335 | 8/2001 |
| JP | 2003-319458 | 11/2003 |
| JP | 2003-324496 | 11/2003 |
| JP | 2009-206799 | 9/2009 |
| JP | 2009-206815 | 9/2009 |
| JP | 2009-206900 | 9/2009 |
| WO | 2005/046282 | 5/2005 |

OTHER PUBLICATIONS

International Search Report dated Jun. 8, 2010, from corresponding International Application No. PCT/JP2010/003014.
Japanese Office Action dated Sep. 9, 2014 for corresponding Application No. 2014-000629.
Japanese Notice of Rejection dated Dec. 2, 2014 from corresponding Application No. 2014-000629.
Office Action dated Mar. 31, 2015, from the corresponding Japanese Patent Application No. 2014-000629.

* cited by examiner

*Primary Examiner* — Sanh Phu
(74) *Attorney, Agent, or Firm* — Katten Muchin Rosenman LLP (57) ABSTRACT

A wireless relay device relays data from a transmitting device to a receiving device by wireless communication. The wireless relay device includes a buffer and a buffer control unit. The buffer temporarily stores relay target data. The buffer control unit controls the buffer, based on comparison of priority of first data received from the transmitting device with priority of second data stored in the buffer, (i) to remove the second data from the buffer and to store the first data in the buffer or (ii) not to store the first data in the buffer.

9 Claims, 9 Drawing Sheets

WIRELESS RELAY DEVICE AND WIRELESS RELAY METHOD

CROSS-REFERENCE TO RELATED APPLICATION

This application is a continuation of International Application No. PCT/JP2010/003014, filed on Apr. 27, 2010, the entire contents of which are incorporated herein by reference.

FIELD

The embodiments discussed herein are related to a relay technology for relaying wireless communication between a transmitting device and a receiving device, for example, relaying wireless communication between a base transceiver station and a mobile station.

BACKGROUND

In the next-generation wireless relay system which demands high-speed transmission of 100 M to 1 G bits per second, it is assumed that a high frequency band is allocated. However, in general, a signal with a high frequency band has a strong straight-line property, compared to a signal with a low frequency band, and it is known that many dead areas where radio waves do not arrive are formed. Therefore, when the transmission power of a base transceiver station is the same as that of a currently available wireless relay system, the coverage of a cell (service area) will decrease when a high frequency band is allocated. The decrease in the coverage of a cell is not preferable, not only because the cost increases with an increase in the number of base transceiver stations but also because handover frequently occurs.

Accordingly, a wireless relay system has been suggested which includes a relay station RN (Relay Node) serving as a wireless relay device that relays wireless communication between a base transceiver station and a mobile station. In general, the cost of a relay station RN is lower than that of a base transceiver station BTS (Base Transceiver Station). Therefore, by introducing a relay station RN, it is possible to reduce the cost of the entire system, while ensuring a sufficient coverage.

As the relay station RN, a so-called amplify-and-forward (AF) type relay station and a so-called decode-and-forward (DF) type relay station are known. For example, the AF type relay station RN amplifies a signal received from a base transceiver station BTS and transmits the amplified signal to a mobile station UE (User Equipment). For example, the DF type relay station RN demodulates and decodes a signal received from a base transceiver station BTS, codes and modulates the signal to reform its frames, amplifies the signal, and transmits the amplified signal to the mobile station UE. The DF type relay station RN can realize the property of a more satisfactory reception error ratio in a receiving device (a base transceiver station or a mobile station), compared to the AF type relay station RN.

To retransmit data from the relay station RN to a receiving device, the relay station RN stores transmitted data in a retransmission buffer, for example, until the relay station RN acquires a signal (ACK) indicating reception completion from the receiving device. When a signal (NACK/DTX) indicating non-completion of the reception from the receiving device is feedback, the data is retransmitted to the receiving device. Therefore, for example, in the relay of the wireless communication from the base transceiver station BTS to the mobile station UE, the retransmission buffer may store many transmission data when there are abundant mobile stations UE (receiving devices) each of which is a relay destination. Therefore, there is a concern that an overflow in the retransmission buffer may occur.

In regard to the control of a buffer memory corresponding to the retransmission buffer, there is a known technology for controlling data in the buffer memory and transmission of the data depending on the use state of the buffer memory. According to this technology, when the amount of data accumulated in the buffer memory is equal to or greater than a predetermined level, the data in the buffer memory is controlled such that the data is released (removed). Further, according to this technology, when the amount of data accumulated in the buffer memory is less than the predetermined level, the data in the buffer memory is controlled such that the data is rarely accumulated in the buffer memory by reducing the amount of data transmitted from a transmitting device. For the related technology, see Japanese Laid-open Patent Publication No. 2003-319458, for example.

In the future, however, the capacity of a retransmission buffer will be reduced in order to miniaturize the relay station RN with the popularization of the relay station RN. In the above-described conventional technology, however, the data is merely controlled depending on whether the amount of data accumulated in the buffer memory is equal to or greater than the predetermined level, and the reduced capacity of the buffer memory is not considered. Further, when high-priority data, such as data with high instantaneousness, is removed from the buffer memory, the data is retransmitted from the transmitting device. Therefore, there is a problem that a delay occurs until the data is received by the receiving device.

SUMMARY

According to an aspect of an embodiment, a wireless relay device that relays data from a transmitting device to a receiving device by wireless communication, includes a buffer that temporarily stores relay target data, and a buffer control unit that controls the buffer, based on comparison of priority of first data received from the transmitting device with priority of second data stored in the buffer, (i) to remove the second data from the buffer and to store the first data in the buffer or (ii) not to store the first data in the buffer.

According to another aspect of an embodiment, a wireless relay method in a wireless relay device that relays data from a transmitting device to a receiving device by wireless communication and includes a buffer temporarily storing relay target data, the wireless relay method includes: receiving first data from the transmitting device; comparing priority of the first data with priority of second data stored in the buffer; controlling the buffer in accordance with the comparison result (i) to remove the second data from the buffer and to store the first data in the buffer or (ii) not to store the first data in the buffer; and transmitting the first data to the receiving device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings.

[a] First Embodiment

Hereinafter, a wireless relay system according to a first embodiment will be described.

Figure 1:
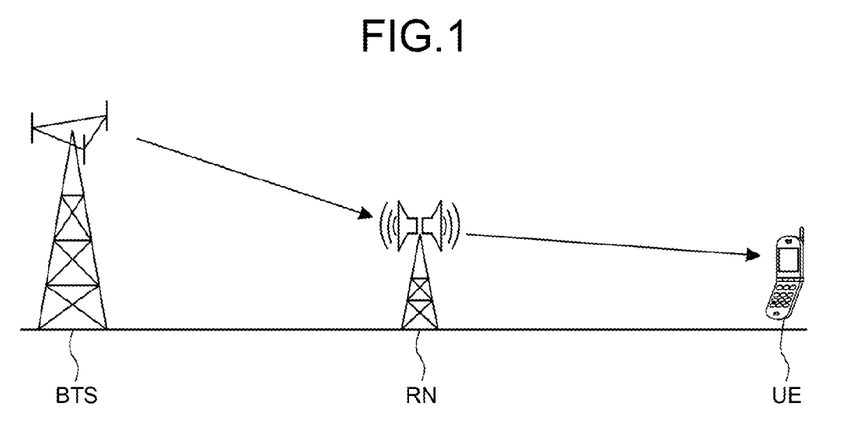
FIG. 1 is a diagram illustrating the overall configuration of a wireless relay system according to a first embodiment.

As illustrated in FIG. 1, the wireless relay system according to the first embodiment includes a base transceiver station BTS (Base Transceiver Station), a relay station RN (Relay Node) serving as a wireless relay device, and a mobile station UE (User Equipment). The relay station RN relays wireless communication between the base transceiver station BTS and the mobile station UE. In the first embodiment, relaying downstream radio signals will be exemplified. That is, the base transceiver station BTS corresponds to a transmitting device and a mobile station UE corresponds to a receiving device.

In the wireless relay system, the relay station RN has a buffer (not illustrated) that temporarily stores data to be transmitted to the mobile station UE in preparation for a case in which the mobile station UE does not receive the data to be relayed; for example, the mobile station UE may not receive the data when the environment of a wireless propagation path is not good between the relay station RN and the mobile station UE. Based on a retransmission control signal (NACK/DTX) fedback from the mobile station UE, the relay station RN recognizes that the mobile station UE has not correctly received the data transmitted from the relay station RN.

The relay station RN according to the first embodiment manages relay target data to be stored in a buffer based on the priority of the data to efficiently utilize the buffer, which is a finite resource, by appropriately restricting relay target data to be stored in the buffer. The priority of the relay target data is determined based on, for example, control information subordinate to the data or a downstream communication quality from the base transceiver station BTS to the relay station RN.

For example, the control information includes pieces of information of various classifications such as an attribute of the relay target data, the number of times the relay target data is retransmitted, the priority of a receiving device that receives the relay target data, and a communication quality between a transmitting device that transmits the relay target data and a relay device. Information of one of these classifications serves as a reference of priority comparison.

The relay station RN compares the priority of data (first data) received from the base transceiver station BTS serving as the transmitting device to the priority of data (second data) stored in the buffer. Then, the relay station RN determines, based on the comparison result, whether to remove the second data from the buffer and store the first data in the buffer or not to store the first data in the buffer. When the priority of the first data is higher than the priority of the second data, the relay station RN preferably removes the second data from the buffer and stores the first data in the buffer. When the priority of the first data is lower than the priority of the second data, the relay station RN does not store the received first data in the buffer. Thereafter, the first data is transmitted to the mobile station UE serving as the receiving device. By performing such buffer control, the high-priority data can be stored in the buffer based on a specific priority comparison reference, and thus the capacity of the buffer can be decreased. Therefore, when a retransmission of the high-priority data is requested from the mobile station UE, the data stored in the buffer can be immediately retransmitted. Thus, it is possible to shorten a delay time when the high-priority data is transmitted to the mobile station UE.

Further, when a retransmission of low-priority data which is not stored in the buffer is requested from the mobile station UE, the relay station RN does not retransmit the data to the mobile station UE based on the data stored in the buffer due to the fact that the data requested to be retransmitted is not present in the buffer. Accordingly, when the data requested to be retransmitted is not present in the buffer, the relay station RN preferably requests the base transceiver station BTS serving as a data transmission source to retransmit the data. Thus, since the data is retransmitted from the base transceiver station BTS, the data can be transmitted to the mobile station UE although the delay time becomes long.

The priority of the data can be determined from various viewpoints. Table 1 illustrates examples of the determination of the priority of the data.

TABLE 1

| Classification of information serving as priority | Contents of information corresponding to reference | Priority of data |
|---|---|---|
| Attribute of relay target data | Attribute indicating real-time property | High |
| | Attribute indicating no real-time property | Low |
| Number of times relay target data is retransmitted | Number of retransmissions (large) | High |
| | Number of retransmissions (small) | Low |
| Priority of receiving device that receives relay target data | Priority of receiving device is high | High |
| | Priority of receiving device is low | Low |
| Communication quality between relay device and transmitting device that transmits relay target data | Downstream SINR (small value) | High |
| | Downstream SINR (large value) | Low |

Hereinafter, classification of the information serving as a priority comparison reference will be described with reference to Table 1. For convenience, Table 1 illustrates examples in which the priority of the data is determined at two levels, high and low priorities, in accordance with the priority comparison reference. However, the priority of the data may, of course, be determined at multiple levels of two or more.

When the priority comparison reference is "an attribute of relay target data", data having an attribute indicating that the attribute of the data is a real-time property is determined as data with high priority. This is because short delay time is preferable in communication when the relay target data is, for example, streaming data reproduced as a video. As another example, when data transmitted in accordance with a communication scheme of a universal mobile telecommunications system (UMTS) known as so-called 3G and data transmitted in accordance with a communication scheme of long term evolution (LTE), which is the next-generation wireless communication system, are present together, a communication scheme used to transmit data can be understood as the attribute of the data. In this case, the priority of the data can be appropriately determined, for example, based on a data communication scheme when data is transmitted from the base transceiver station BTS. For example, when data communication is performed mainly in accordance with the LTE in an urban area and data communication is performed mainly in accordance with the UMTS in a suburb area, the priority of data transmitted in accordance with a communication scheme of the LTE is determined to be high in the urban area and the priority of data transmitted in accordance with a communication scheme of the UMTS is conversely determined to be high in the suburb area.

When the priority comparison reference is "the number of times the relay target data is retransmitted", data which has been retransmitted many times is determined as data with high priority. The reason why the data which has been retransmitted many times is determined as the data with high priority is to prevent additional delay since delay has already occurred in communication of data retransmitted many times. Further, when Hybrid Auto Repeat reQuest (HARQ) is employed, this is because the communication of the data which has been retransmitted many times easily succeeds due to a synthesizing process by the HARQ of data received in a receiving device.

When the priority comparison reference is "the priority of a receiving device that receives the relay target data", data indicating high priority of the receiving device is determined as data with high priority. For example, when special charging is performed for the user of the mobile station UE serving as a receiving device, the priority of the mobile station UE of the user can be determined to be higher than the priority of the mobile station UE of the user for which no charging is performed. That is, the priority of data destined for the mobile station UE with high priority is determined to be high.

When the priority comparison reference is "a communication quality between the relay device and the transmitting device that transmits the relay target data", for example, data indicating that a downstream SINR has a small value is determined as data with high priority. The downstream SINR is measured in the relay station RN based on an existing reference signal transmitted from the base transceiver station BTS. When the relay station RN relays communication from the plurality of base transceiver stations BTS, the environments of wireless propagation paths between the base transceiver stations BTS and the relay station RN are different from each other. In this case, the relay station RN determines that the priority of data transmitted from the base transceiver station BTS in a situation (that is, a situation in which the downstream SINR is small) in which the environment of the wireless propagation path is not good is high. In the situation in which the environment of the wireless propagation path between the base transceiver station BTS and the relay station RN is not good, it takes some time to retransmit the data from the base transceiver station BTS.

Consequently, considerable delay may occur when the data is transmitted to the mobile station UE. Accordingly, it is preferable that the data transmitted in this situation is preferentially stored in the buffer of the relay station RN so that the base transceiver station BTS is not requested to retransmit the data.

Next, a wireless relay method according to this embodiment will be described with reference to FIGS. 2 and 3.

Figure 2:
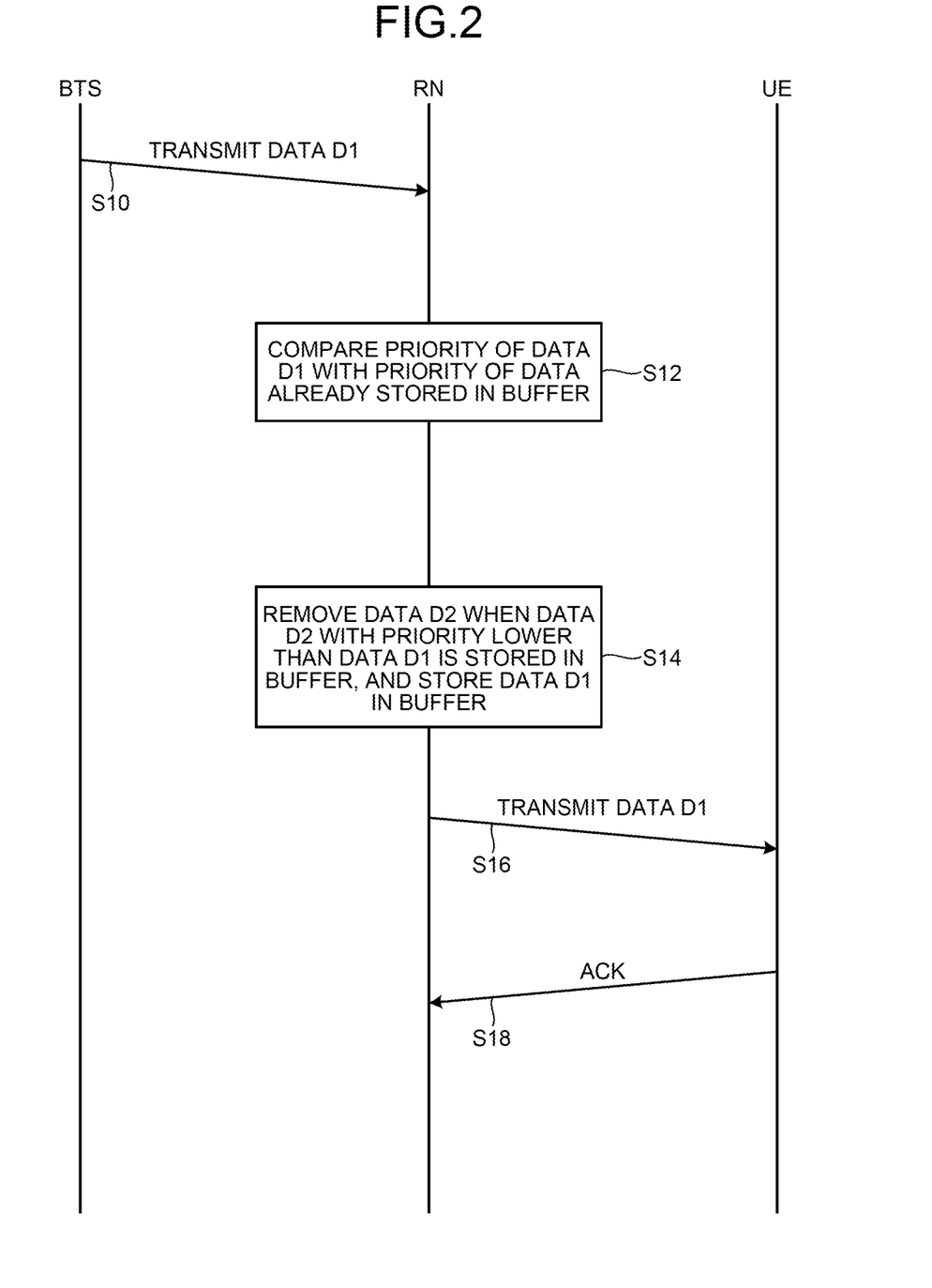
FIG. 2 is a diagram illustrating the flow of a wireless relay method when data is not retransmitted from a base transceiver station BTS according to the first embodiment.

FIG. 2 is a diagram illustrating the flow of a wireless relay method when data is not retransmitted from a base transceiver station BTS. FIG. 3 is a diagram illustrating the flow of a wireless relay method when data is retransmitted from the base transceiver station BTS. In FIGS. 2 and 3, step S10 and step S12 are common steps.

First, referring to FIG. 2, the base transceiver station BTS transmits new data D1 destined for the mobile station UE to the relay station RN (step S10). When the relay station RN receives the data D1, the relay station RN compares the priority of the data D1 with the priority of data already stored in the retransmission buffer (step S12). Here, the classification of the information serving as the priority comparison reference may be fixed, or may be changed appropriately by notification from the base transceiver station BTS. The relay station RN compares the priorities of the data with each other, referring to the control information subordinate to the data or the value of a communication quality of the downlink measured by the relay station RN between the relay station RN and the base transceiver station BTS. When data D2 as data with priority lower than the data D1 is present in the buffer as the comparison result, the relay station RN removes the data D2 from the buffer and stores the data D1 received in step S10 in the buffer (step S14). Then, the relay station RN transmits the data D1 to the mobile station UE (step S16). When the mobile station UE correctly receives the data D1, the mobile station UE transmits "ACK" as a retransmission control signal to the relay station RN (step S18).

Figure 3:
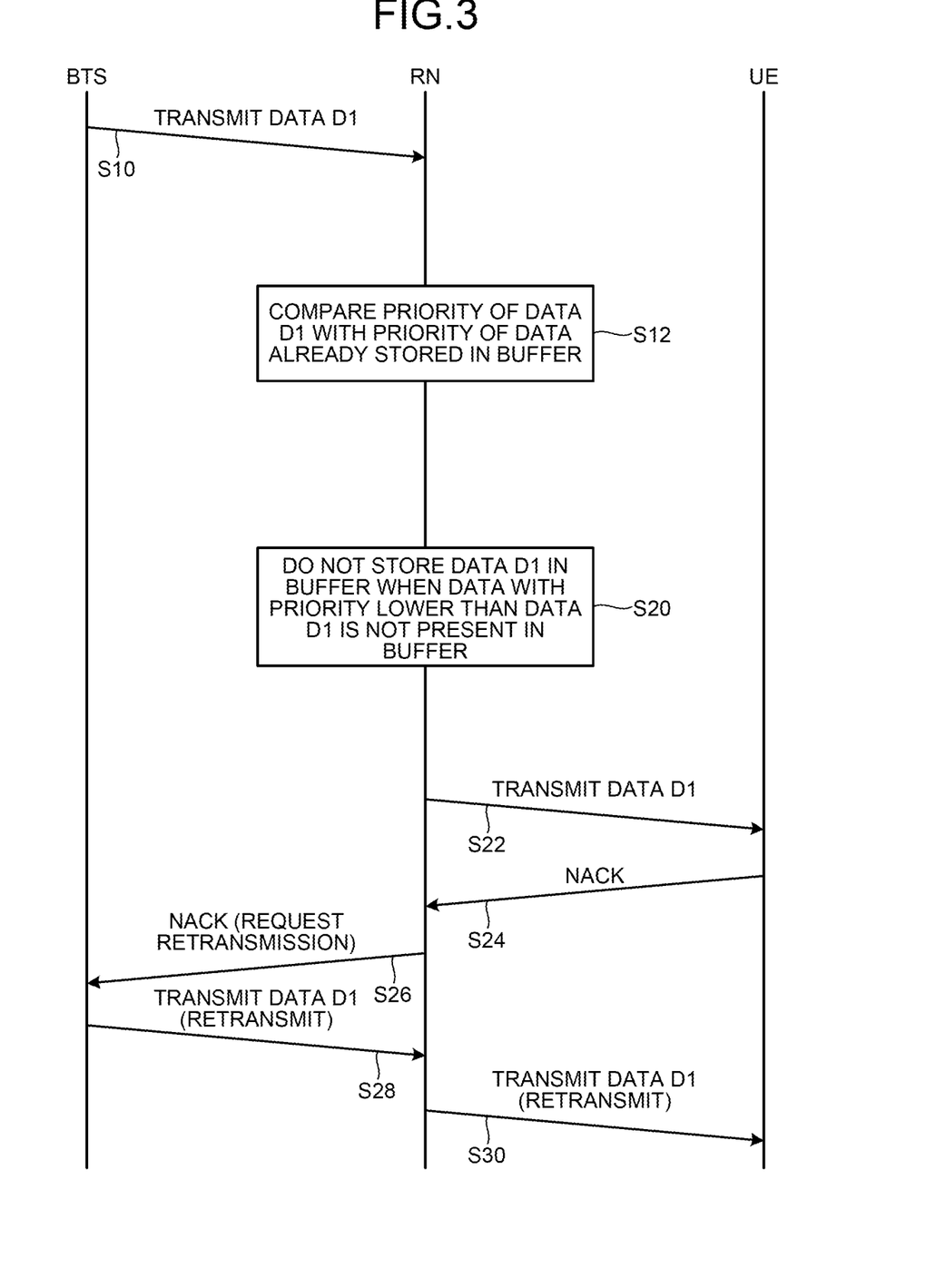
FIG. 3 is a diagram illustrating the flow of a wireless relay method when data is retransmitted from the base transceiver station BTS according to the first embodiment.

Next, referring to FIG. 3, step S10 and step S12 are the same as those of FIG. 2. Step S20 of FIG. 3 is different from step S14 of FIG. 2. It is assumed that the data D2 as the data with the priority lower than the data D1 is not present in the buffer. In this case, the data D1 received in step S10 is not stored in the buffer (step S20). The data D1 is transmitted to the mobile station UE (step S22).

The flow of FIG. 3 is different from the flow of FIG. 2 in that it is assumed that the mobile station UE does not correctly receive the data D1. That is, in step S24 of FIG. 3, the mobile station UE transmits "NACK" as a retransmission control signal to the relay station RN (step S24). At this time, since the relay station RN does not store the data D1 in the buffer of the relay station RN, the relay station RN requests the base transceiver station BTS serving as the transmitting source to retransmit the data D1. That is, the relay station RN receives "NACK" from the mobile station UE and transmits "NACK" of the retransmission control signal as a data retransmission request to the base transceiver station BTS serving as the data transmitting source (step S26). When the base transceiver station BTS receives "NACK" from the relay station RN, the base transceiver station BTS retransmits the data D1 to the relay station RN (step S28). The relay station RN retransmits the data D1 to the mobile station UE based on the data D1 retransmitted from the base transceiver station BTS (step S30).

In the wireless relay system according to the first embodiment, as described above, the relay station RN compares the priority of the data (first data) received from the base transceiver station BTS (transmitting device) with the priority of the data (second data) stored in the buffer of the relay station RN. Then, based on the comparison result of the priorities of the data, the relay station RN removes the second data from the buffer and stores the first data in the buffer, or transmits the first data to the mobile station UE (receiving device) without storing the first data in the buffer. Accordingly, when the data is relayed from the base transceiver station BTS (transmitting device) to the mobile station UE (receiving device) by the wireless communication, the capacity of the buffer that temporarily stores the relay target data can be reduced. Therefore, the entire relay station RN can be downsized.

The data is more likely to be stored in the retransmission buffer of the relay station RN when the priority of the relay target data is high than when the priority of the relay target data is low. Therefore, when the data with high priority is retransmitted to the mobile station UE (receiving device), the base transceiver station BTS (transmitting device) is not requested to retransmit the data. Accordingly, communication delay of the data with high priority scarcely occurs.

[b] Second Embodiment

Hereinafter, the wireless relay system according to a second embodiment will be described.

In the second embodiment, examples of specific configurations of the relay station RN and the mobile station UE will be described. In the Long Term Evolution (LTE), the OFDM is applied to a downstream signal. A process based on the OFDM will be described appropriately in the description of each configuration below.

Figure 4:
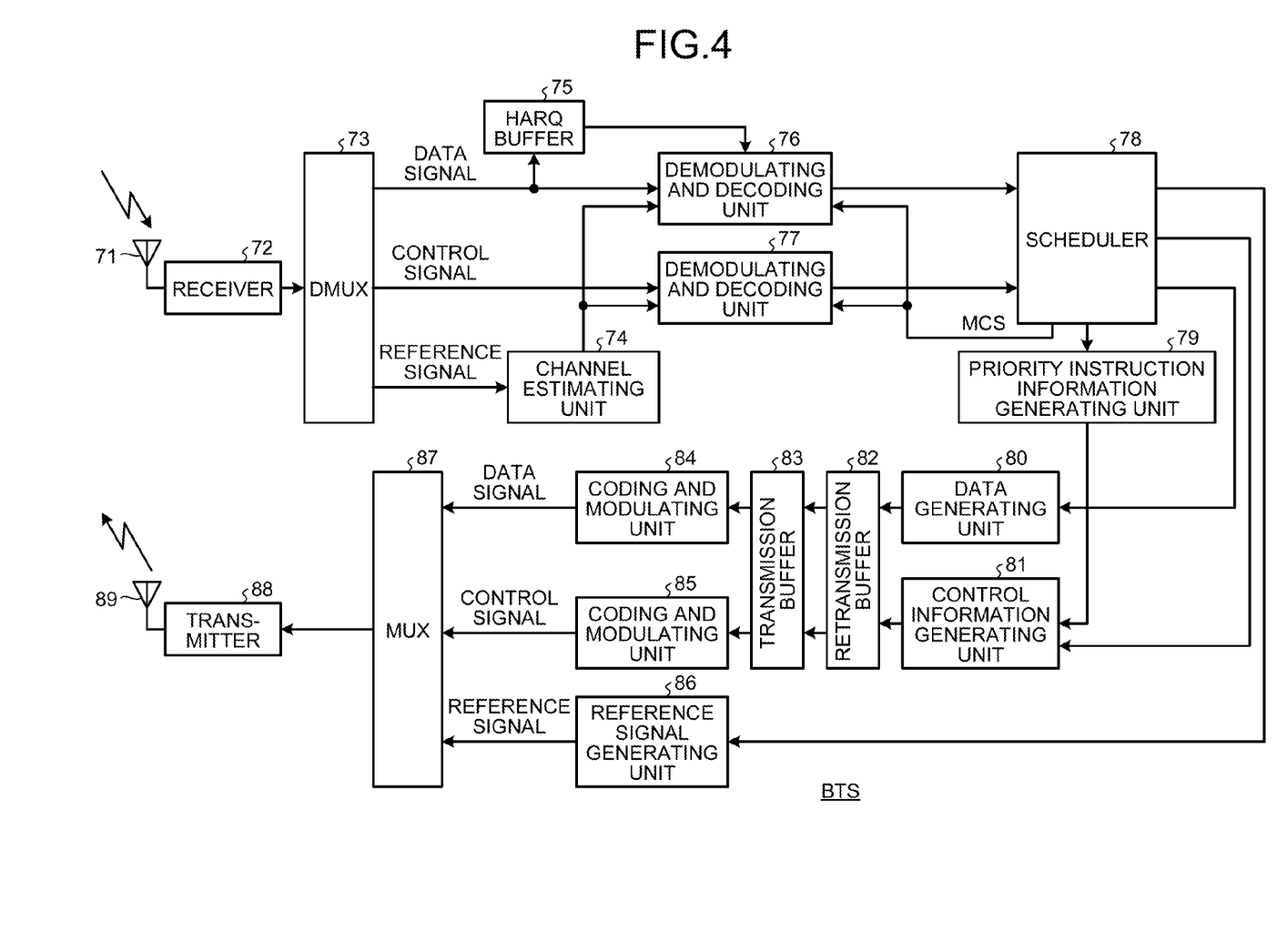
FIG. 4 is a block diagram illustrating main units in the internal configuration of a base transceiver station BTS according to a second embodiment.
Figure 5:
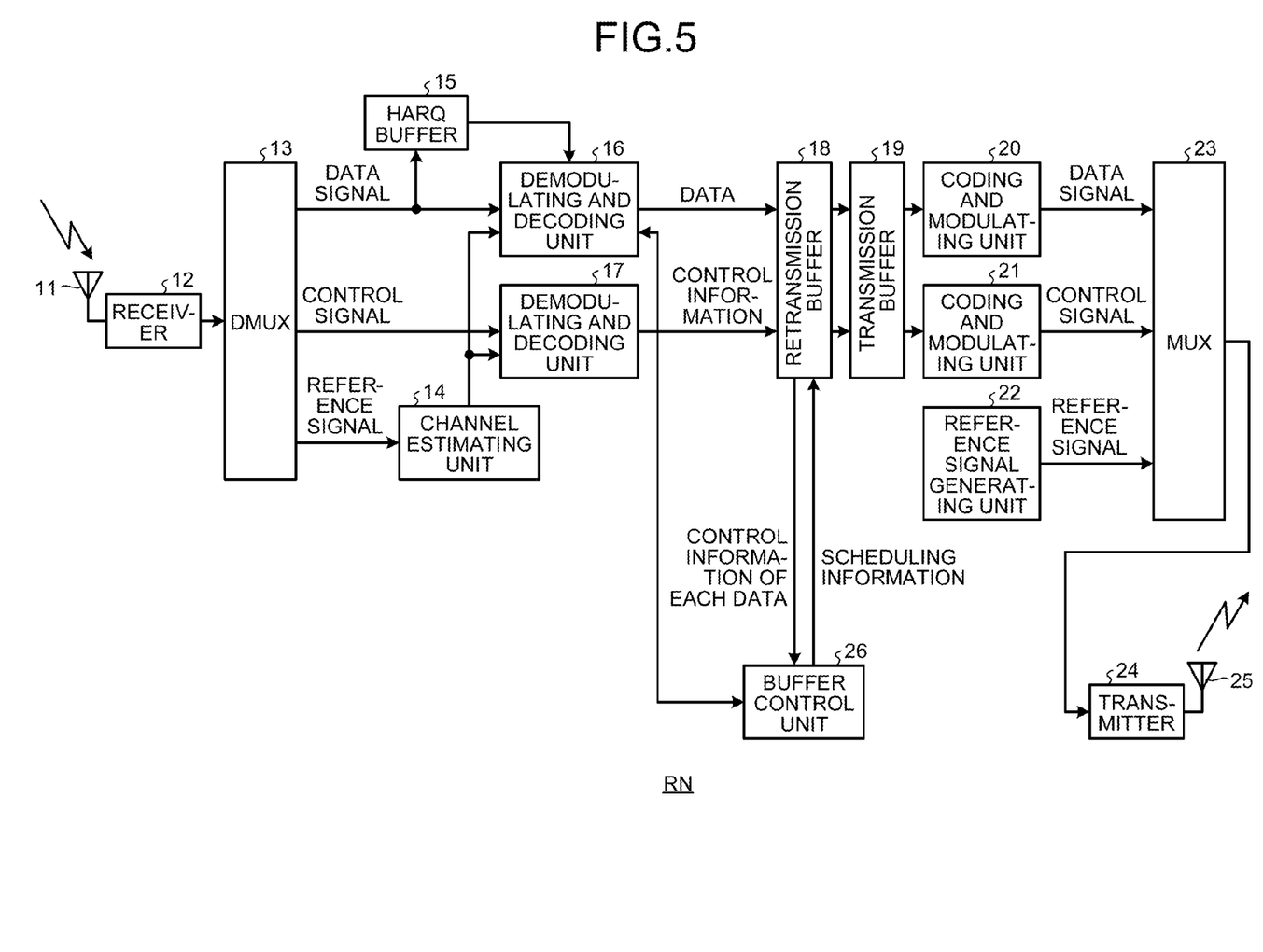
FIG. 5 is a block diagram illustrating main units in the internal configuration of a relay station RN according to the second embodiment.
Figure 6:
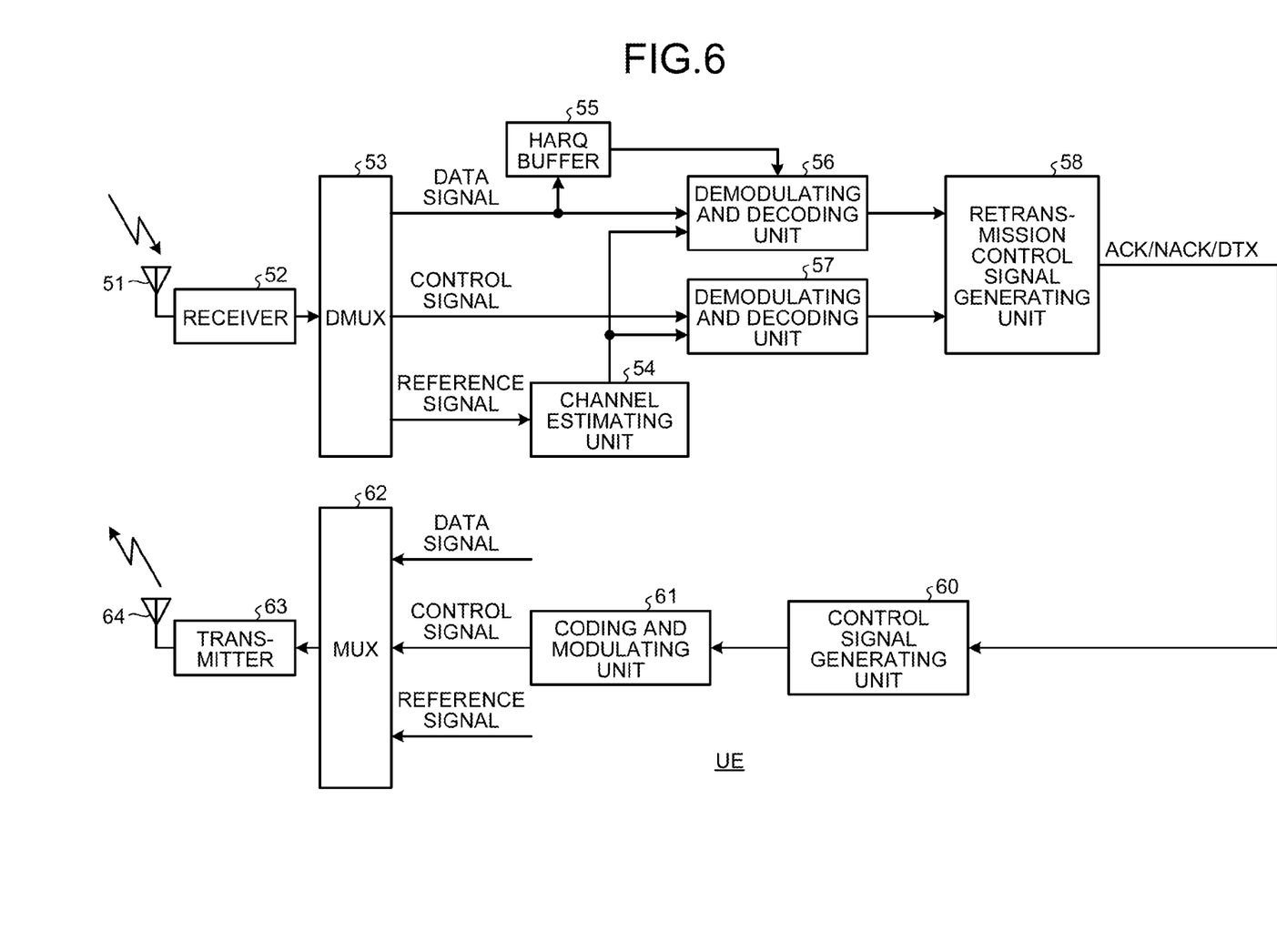
FIG. 6 is a block diagram illustrating main units in the internal configuration of a mobile station UE according to the second embodiment.

Examples of Configurations of Base Transceiver Station BTS, Relay Station RN, and Mobile Station UE Hereinafter, the configurations of the base transceiver station BTS, the relay station RN, and the mobile station UE in the wireless relay system according to the second embodiment will be described with reference to FIGS. 4 to 6, respectively. FIG. 4 is a block diagram illustrating main units in the internal configuration of the base transceiver station BTS. FIG. 5 is a block diagram illustrating main units in the internal configuration of the relay station RN. FIG. 6 is a block diagram illustrating main units in the internal configuration of the mobile station UE.

Configuration of Base Transceiver Station BTS

As illustrated in FIG. 4, the base transceiver station BTS includes a receiving antenna 71, a receiver 72, a demultiplexing unit (DMUX) 73, a channel estimating unit 74, an HARQ buffer 75, demodulating and decoding units 76 and 77, a scheduler 78, a priority instruction information generating unit 79, a data generating unit 80, a control information generating unit 81, a retransmission buffer 82, a transmission buffer 83, coding and modulating units 84 and 85, a reference signal generating unit 86, a multiplexing unit (MUX) 87, a transmitter 88, and a transmitting antenna 89.

The receiver 72 converts an upstream RF signal received via the receiving antenna 71 into a digital baseband signal. The receiver 72 includes a band limitation filter, a low noise amplifier (LNA), a local frequency generator, an orthogonal demodulator, an automatic gain control (AGC) amplifier, and an analog-to-digital (A/D) converter.

The demultiplexing unit 73 demultiplexes a received signal (baseband signal) into a data signal, a control signal, and a reference signal. Examples of the reference signal include an existing pilot symbol and a preamble.

When an orthogonal frequency division multiplexing (OFDM) communication scheme is selected, the demultiplexing unit 73 removes a guard interval (GI), and then generates a coding symbol string of each sub-carrier through a fast Fourier transform (FFT) process in which a predetermined FFT window is set. Then, the demultiplexing unit 73 demultiplexes the signal into the data signal, the control signal, and the reference signal inserted into a predetermined sub-carrier.

The channel estimating unit 74 performs a channel estimating process based on the demultiplexed reference signal and the existing reference signal of the relay station RN. In the channel estimating process, channel status information (CSI) regarding an uplink from the relay station RN to the base transceiver station BTS is obtained by calculating a correlation value between the received and obtained reference signal and the existing reference signal. The CSI can be transferred to the demodulating and decoding units 76 and 77.

The demodulating and decoding units 76 and 77 each demodulate and decode the data signal and the control signal. In the demodulating and decoding processes, channel compensation is performed on the data signal and the control signal using the CSI calculated by the channel estimating unit 74. For example, when the OFDM communication scheme is selected, the channel compensation is performed on each sub-carrier and each OFDM symbol to compensate phase rotation or the like which may occur in a propagation path.

The HARQ buffer 75 is a buffer that is provided to perform HARQ when data is retransmitted to the relay station RN. In the HARQ operation, the base transceiver station BTS transmits a data block obtained by performing error correction coding (ECC) on information bits to the relay station RN. When the relay station RN does not correctly receive the data block, the base transceiver station BTS transmits another data block generated based on the same information bits to the relay station RN. The relay station RN reproduces the original information bits based on the plurality of data blocks. Thus, an error correction performance in the decoding can be improved by decreasing a coding ratio of the data block to be decoded in the relay station RN.

The data signal obtained by the demultiplexing unit 73 is temporarily stored in the HARQ buffer 75 and is supplied to the demodulating and decoding unit 76 when the HARQ is performed.

The HARQ is not necessarily performed in this embodiment.

The scheduler 78 determines scheduling (wireless resource allocation) of a downstream signal destined for the relay station RN connected to the base transceiver station BTS and the mobile station UE, determines a modulation and coding scheme (MCS) of the downstream signal, and controls a downstream transmission timing on a resource block basis. As illustrated in FIG. 4, the scheduler 78 notifies the demodulating and decoding units 76 and 77 of the MCS, when an upstream data signal and an upstream control signal are demodulate and decoded.

The data generating unit 80 generates data to be transmitted to the relay station RN, when an instruction is given from the scheduler 78. The control information generating unit 81 generates control information to be transmitted to the relay station RN, when an instruction is given from the scheduler 78.

The control information generated by the control information generating unit 81 includes information of various classifications serving as the priority comparison reference of the data in the relay station RN. For example, when it is known that the attribute of data transmitted to the relay station RN is an attribute indicating a real-time property, for example, based on information from an upper layer, the control information of the data includes information indicating that the attribute of the data is the real-time property.

The control information may include priority instruction information generated by the priority instruction information generating unit 79. The priority instruction information is information that is used to instruct the relay station RN of the classification of the information serving as the data priority comparison in the relay station RN among the information of various classifications serving as the data priority comparison in the relay station RN.

The data and the control information are stored sequentially in the retransmission buffer 82 and the transmission buffer 83, and then are transmitted to the coding and modulating units 84 and 85. Further, the retransmission buffer 82 is a buffer that temporarily stores the data in preparation for a case in which the relay station RN notifies the base transceiver station BTS of a request for retransmitting the data.

The coding and modulating units 84 and 85 each code and modulate the data and the control information to be transmitted. The reference signal generating unit 86 generates a reference signal to be transmitted to the relay station RN, when an instruction is given from the scheduler 78.

The multiplexing unit 87 multiplexes the data signal and the control signal obtained through the coding and modulating and the reference signal generated by the reference signal generating unit 86 and generates a baseband signal to be transmitted. For example, when the OFDM communication scheme is selected, the multiplexing unit 87 performs a GI adding process and an inverse fast Fourier transform (IFFT) process to convert each sub-carrier signal into a time-region signal.

The transmitter 88 includes a digital-to-analog (D/A) converter, a local-frequency generator, a mixer, a power amplifier, and a filter. The transmitter 88 processes the baseband signal from the multiplexing unit 87 to up-convert the baseband frequency into a wireless frequency, and then releases the processed signal to a space via the transmitting antenna 89.

Configuration of Relay Station RN

As illustrated in FIG. 5, the relay station RN includes a receiving antenna 11, a receiver 12, a demultiplexing unit (DMUX) 13, a channel estimating unit 14, an HARQ buffer 15, demodulating and decoding units 16 and 17, a retransmission buffer 18, a transmission buffer 19, coding and modulating units 20 and 21, a reference signal generating unit 22, a multiplexing unit (MUX) 23, a transmitter 24, a transmitting antenna 25, and a buffer control unit 26.

The receiver 12 converts a downstream RF signal received from the base transceiver station BTS via the receiving antenna 11 into a digital baseband signal. The receiver 12 includes a band limitation filter, a low noise amplifier (LNA), a local frequency generator, an orthogonal demodulator, an automatic gain control (AGC) amplifier, and an analog-to-digital (A/D) converter.

The demultiplexing unit 13 demultiplexes a received signal (baseband signal) into a data signal, a control signal, and a reference signal. Examples of the reference signal include an existing pilot symbol and a preamble.

When an orthogonal frequency division multiplexing (OFDM) communication scheme is selected, the demultiplexing unit 13 removes a guard interval (GI), and then generates a coding symbol string of each sub-carrier through a fast Fourier transform (FFT) process in which a predetermined FFT window is set. Then, the demultiplexing unit 13 demultiplexes the signal into the data signal, the control signal, and the reference signal inserted into a predetermined sub-carrier.

The channel estimating unit 14 performs a channel estimating process based on the demultiplexed reference signal and the existing reference signal of the relay station RN. In the channel estimating process, channel status information (CSI) regarding a downlink from the base transceiver station BTS to the relay station RN is obtained by calculating a correlation value between the received and obtained reference signal and the existing reference signal. The CSI can be transferred to the demodulating and decoding units 16 and 17.

The demodulating and decoding units 16 and 17 each demodulate and decode the data signal and the control signal to obtain the data and the control information. In the demodulating and decoding processes, channel compensation is performed on the data signal and the control signal using the CSI calculated by the channel estimating unit 14. For example, when the OFDM communication scheme is selected, the channel compensation is performed on each sub-carrier and each OFDM symbol to compensate phase rotation or the like which may occur in a propagation path.

The HARQ buffer 15 is a buffer that is provided to perform HARQ when data is retransmitted to the mobile station UE. In the HARQ operation, the relay station RN transmits a data block obtained by performing error correction coding (ECC) on information bits to a receiving device (in this embodiment, the mobile station UE). When the mobile station UE does not correctly receive the data block, the relay station RN transmits another data block generated based on the same information bits to the mobile station UE. The mobile station UE reproduces the original information bits based on the plurality of data blocks. Thus, an error correction performance in the decoding can be improved by decreasing a coding ratio of the data block to be decoded in the mobile station UE.

The data signal obtained by the demultiplexing unit 13 is temporarily stored in the HARQ buffer 15 and is supplied to the demodulating and decoding unit 16 when the HARQ is performed.

The HARQ is not necessarily performed in the second embodiment.

The data and the control information obtained through the demodulating and the decoding can be temporarily stored in the retransmission buffer 18 in preparation for a case in which the data is retransmitted. When data is newly transmitted to the mobile station UE, the buffer control unit 26 controls whether the data and the control information are stored in the retransmission buffer 18, as described below. When the data and the control information are stored in the retransmission buffer 18, the same (or copied) data and control information are transmitted to the transmission buffer 19, while the data is stored in the retransmission buffer.

The coding and modulating units 20 and 21 each code and modulate the data and the control information to be transmitted.

The multiplexing unit 23 multiplexes the data signal and the control signal obtained through the coding and modulating and the reference signal generated by the reference signal generating unit 22 and generates a baseband signal to be transmitted. For example, when the OFDM communication scheme is selected, the multiplexing unit 23 performs a GI adding process and an inverse fast Fourier transform (IFFT) process to convert each sub-carrier signal into a time-region signal.

The transmitter 24 includes a digital-to-analog (D/A) converter, a local-frequency generator, a mixer, a power amplifier, and a filter. The transmitter 24 processes the baseband signal from the multiplexing unit 23 to up-convert the baseband frequency into a wireless frequency, and then releases the processed signal to a space via a transmitting antenna 25.

The buffer control unit 26 controls the retransmission buffer 18 such that data with high priority is stored in the retransmission buffer 18 and data with low priority is not stored in the retransmission buffer 18. The classification of the information serving as the priority comparison reference is set in advance in the relay station RN, is set based on the priority instruction information included in the control information from the base transceiver station BTS, or is set based on the priority instruction information generated by the relay station RN. The buffer control unit 26 refers to the control information subordinate to each data in the contents of the information corresponding to the priority comparison reference of the data. When the control information is referred to, the control information (control information obtained by the demodulating and decoding unit 17) of newly received data and the control information of the data in the retransmission buffer 18 are referred to.

The buffer control unit 26 transfers scheduling information as the control result to the retransmission buffer 18. The scheduling information is information that is used to instruct the retransmission buffer 18 that the retransmission buffer 18 stores or does not store the newly received data or used to instruct the retransmission buffer 18 that the newly received data is substituted for specific data in the retransmission buffer 18.

An operation of the buffer control unit 26 will be described later.

The retransmission control signal (ACK/NACK/DTX) which the relay station RN receives from the mobile station UE is included in the control signal obtained by the demultiplexing unit 13. When the data is retransmitted to the mobile station UE based on the retransmission control signal included in the control signal and retransmission data is stored in the retransmission buffer 18, the retransmission data is read from the retransmission buffer 18 and is retransmitted. When the retransmission data is not stored in the retransmission buffer 18, the base transceiver station BTS serving as the transmitting device is requested to retransmit the data. A signal indicating the request for retransmitting the data is included in the control signal transmitted to the base transceiver station BTS, that is, is included in the control signal obtained by the coding and modulating unit 21. That is, the coding and modulating unit 21 is a kind of retransmission requesting unit.

Configuration of Mobile Station UE

As illustrated in FIG. 6, the mobiles station UE includes a receiving antenna 51, a receiver 52, a demultiplexing unit (DMUX) 53, a channel estimating unit 54, an HARQ buffer 55, demodulating and decoding units 56 and 57, a retransmission control signal generating unit 58, a control signal generating unit 60, a coding and modulating unit 61, a multiplexing unit (MUX) 62, a transmitter 63, and a transmitting antenna 64.

The receiver 52 converts a downstream RF signal received from the relay station RN via the receiving antenna 51 into a digital baseband signal. The receiver 52 includes a band limitation filter, a low noise amplifier (LNA), a local frequency generator, an orthogonal demodulator, an AGC amplifier, and an A/D converter.

The demultiplexing unit 53 demultiplexes a received signal (baseband signal) into a data signal, a control signal, and a reference signal. Examples of the reference signal include an existing pilot symbol and a preamble.

The channel estimating unit 54 performs a channel estimating process based on the demultiplexed reference signal and the existing reference signal of the mobile station UE. In the channel estimating process, channel status information (CSI) regarding a downlink from the relay station RN to the mobile station UE is obtained by calculating a correlation value between the received and obtained reference signal and the existing reference signal. The CSI can be transferred to the demodulating and decoding units 56 and 57.

The demodulating and decoding units 56 and 57 each demodulate and decode the data signal and the control signal. In the demodulating and decoding processes, channel compensation is performed on the data signal and the control signal using the CSI calculated by the channel estimating unit 54.

The HARQ buffer 55 is a buffer that is provided to perform HARQ when data is retransmitted from the relay station RN. The HARQ may not be necessarily performed in this embodiment.

The retransmission control signal generating unit 58 determines whether the data can be correctly received based on the result obtained by decoding the data signal and the control signal. The retransmission control signal generating unit 58 generates the retransmission control signal in accordance with the determination result and supplies the generated retransmission control signal to the control signal generating unit 60. The retransmission control signal includes, for example, "ACK", "NACK", and "DTX." "ACK" indicates that the data was able to be correctly received. "NACK" indicates that the data was able to be received but the data was not correct. "DTX" indicates that the received data may not be obtained.

The control signal generating unit 60 generates the control signal including the retransmission control signal (ACK/NACK/DTX). The coding and modulating unit 61 codes and modulates the control signal generated by the control signal generating unit 60.

The multiplexing unit 62 multiplexes the data signal, the control signal, and the reference signal subject to the coding and the modulating and generates a baseband signal to be transmitted. The transmitter 63 processes the baseband signal from the multiplexing unit 62 to up-convert the baseband frequency into a wireless frequency, and then releases the processed signal to a space via the transmitting antenna 64.

Operation of Relay Station RN

Figure 7:
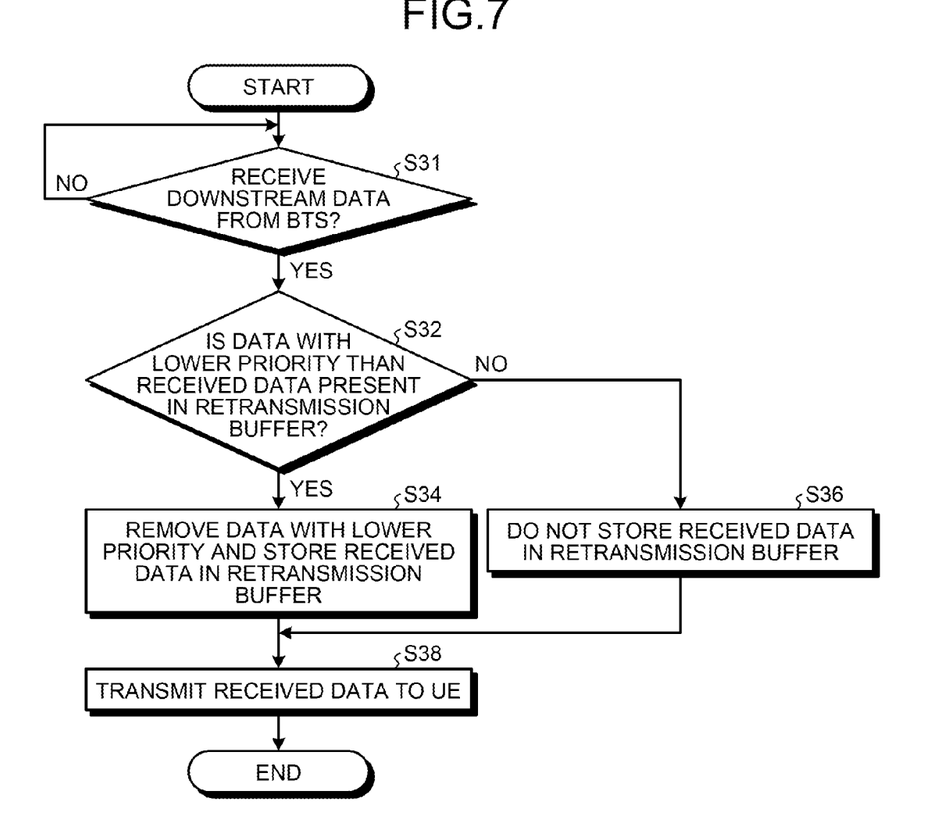
FIG. 7 is a flowchart illustrating an operation of the relay station RN according to the second embodiment.
Figure 8:
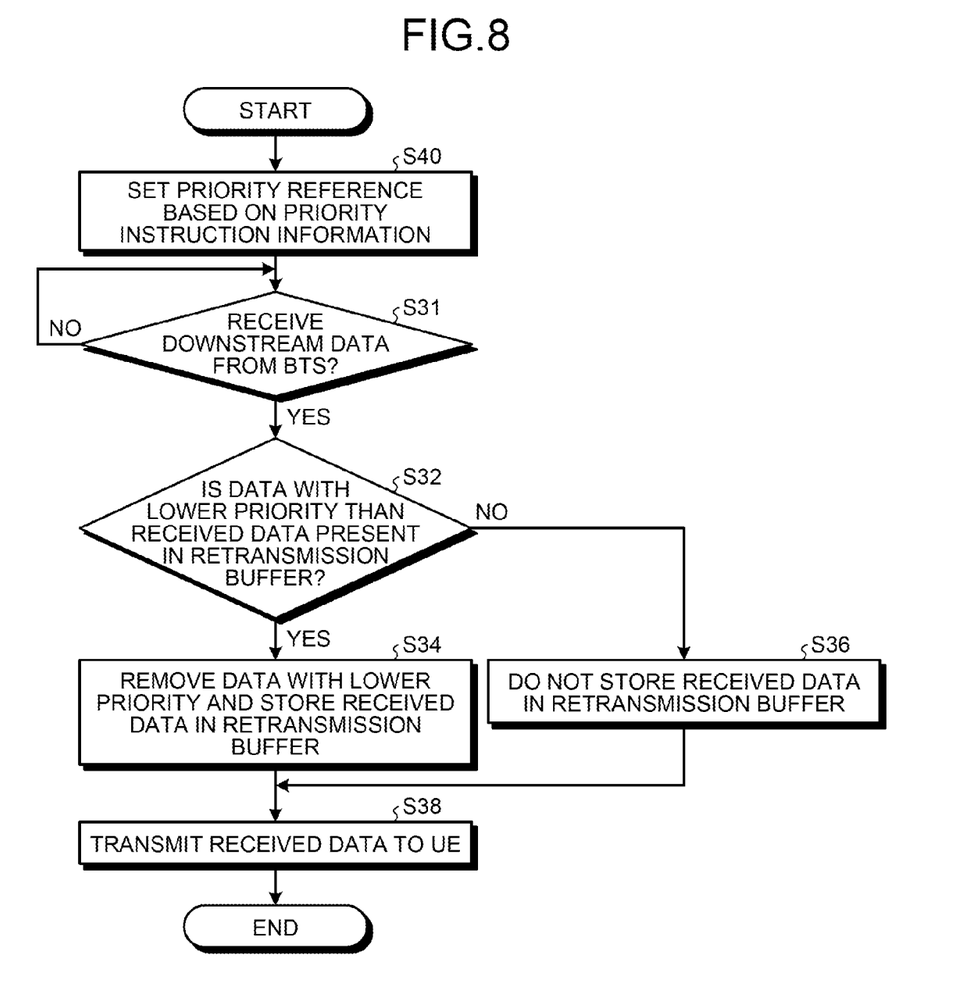
FIG. 8 is a flowchart illustrating an operation of a relay station RN according to a modified example of the second embodiment.

Next, an operation of the relay station RN according to the second embodiment will be described with reference to FIGS. 7 and 8. FIGS. 7 and 8 are flowcharts illustrating main parts of the operation of the relay station RN.

Referring to FIG. 7, it is assumed that downstream data destined for a specific mobile station UE from the base transceiver station BTS is received by the relay station RN (step S31). The received signal is converted into a baseband signal by the receiver 12, and then is demultiplexed into a data signal, a control signal, and a reference signal by the demultiplexing unit 13. The demodulating and decoding units 16 and 17 each demodulate and decode the data signal and the control signal to obtain data and control information.

In the buffer control unit 26, the classifications of the information serving as the priority comparison reference of the data are set in advance in the relay station RN. Then, the buffer control unit 26 determines whether the data with lower priority than the data received in step S31 is present in the retransmission buffer 18 (step S32). At this time, the buffer control unit 26 determines the priorities of the data based on the priority comparison reference set in advance, referring to the control information (the control information obtained by the demodulating and decoding unit 17) of newly received data and the control information of the data in the retransmission buffer 18. For example, when the priority comparison reference is "the attribute of the data" and the control information includes information indicating that the attribute of the data is the real-time property, the data is determined as the data with higher priority (see Table 1).

When the buffer control unit 26 determines that the data with lower priority than the data received in step S30 is present in the retransmission buffer 18 as the determination result of step S32, the buffer control unit 26 removes the data with the lower priority from the retransmission buffer 18 and stores the received data in the retransmission buffer 18 (step S34). Conversely, when the buffer control unit 26 determines that the data with lower priority than the data received in step S31 is not present in the retransmission buffer 18 as the determination result of step S32, the buffer control unit 26 does not store the received data in the retransmission buffer 18 (step S36). The processes of step S34 and step S36 in the retransmission buffer 18 are performed based on the scheduling information transferred from the buffer control unit 26 to the retransmission buffer 18.

Thereafter, the received data is transmitted together with the subordinate control information to the mobile station UE (step S38).

The flowchart of FIG. 8 is the same as the flowchart of FIG. 7. However, the flowchart of FIG. 8 is different from the flowchart of FIG. 7 in that the classifications of the information serving as the priority comparison reference of the data in the buffer control unit 26 is set based on the priority instruction information included in the control information from the base transceiver station BTS (step S40). When the base transceiver station BTS notifies of the priority comparison reference of the data in the relay station RN, it is possible to obtain the advantage of flexibly setting the priority comparison reference depending on an applicable system. For example, since an environment of a wireless propagation path between the base transceiver station BTS and the relay station RN is important in a multi-hop system, the communication quality between the base transceiver station BTS and the relay station RN is preferably used as a reference. On the other hand, since whether the data has an attribute indicating the real-time property is important in the relay station RN that mainly transfers streaming data to reproduce a moving image, the attribute of the data is preferably used as a reference.

[c] Third Embodiment

Hereinafter, a wireless relay system according to a third embodiment will be described. In the wireless relay system according to the third embodiment, the configuration illustrated in FIG. 5 can be used as the configuration of the relay station RN. However, the configuration of the relay station RN is different from the configuration illustrated in FIG. 5 in that the retransmission buffer 18 notifies the buffer control unit 26 of a remaining buffer amount as an amount of data newly storable in the retransmission buffer 18.

Figure 9:
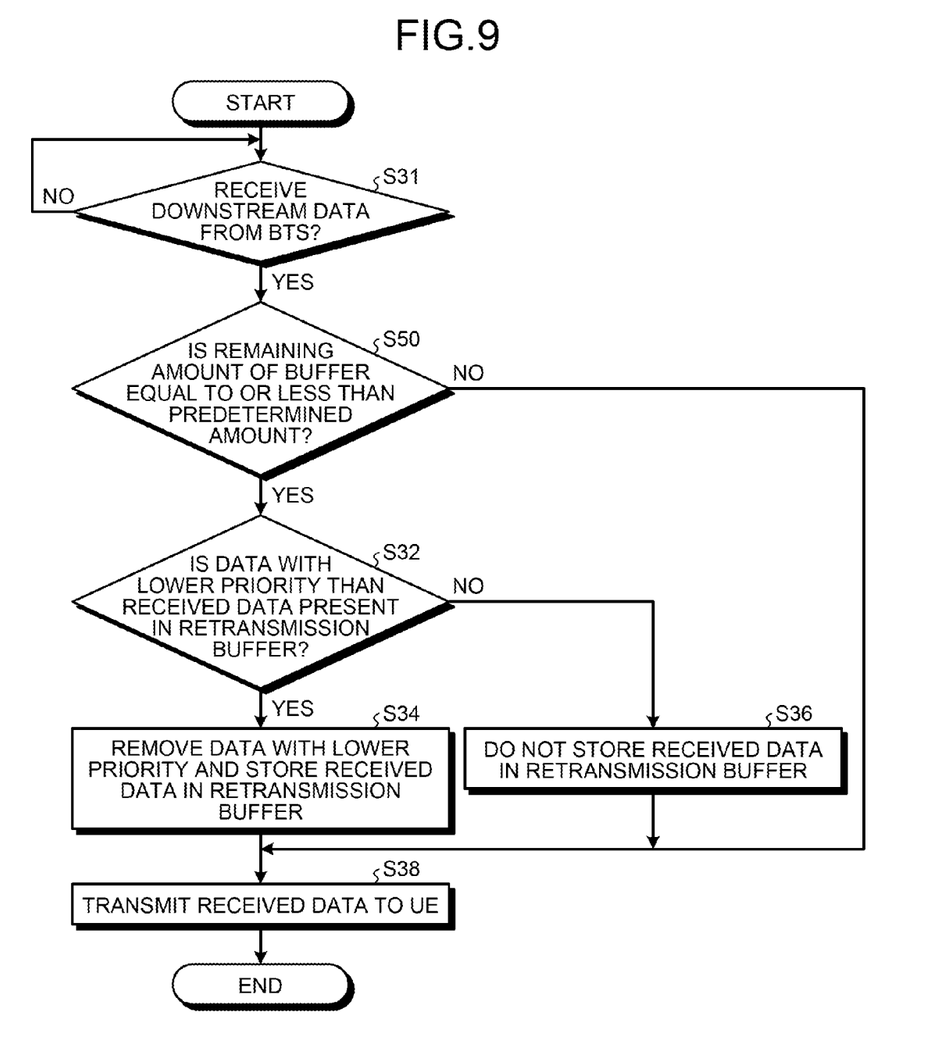
FIG. 9 is a flowchart illustrating an operation of a relay station RN according to a third embodiment.

In this embodiment, the control of the relay station RN in FIG. 7 is performed under a condition that the remaining buffer amount as the amount of data newly storable in the retransmission buffer 18 is equal to or less than the predetermined amount. FIG. 9 is a flowchart illustrating the operation of the relay station RN according to this embodiment. The flowchart of FIG. 9 is different from the flowchart of FIG. 7 in that step S50 is added. That is, in step S50, it is determined whether the remaining buffer amount of the retransmission buffer 18 is equal to or less than the predetermined amount.

Then, when the condition that the remaining buffer amount is equal to or less than the predetermined amount is satisfied, the processes of step S32 to step S36 described with reference to FIG. 7 are performed. According to this control, the control of the buffer in accordance with the priority of the data is not performed, when the remaining buffer amount is equal to or greater than the predetermined amount. Accordingly, when the remaining buffer amount is sufficient, the data with low priority is stored in the buffer, and thus the delay of the communication time in the retransmission of the data with low priority is shortened.

The plurality of embodiments of the invention have been described in detail. However, the wireless relay device and the wireless relay method according to the invention are not limited to the above-described embodiments. The invention may, of course, be improved or modified in various forms within the scope of the invention without departing from the gist of the invention.

For example, in the above-described embodiments, the case has been described in which the downstream wireless communication is relayed from the base transceiver station BTS (transmitting device) to the mobile station UE (receiving device), but the invention is not limited thereto. The invention is, of course, applicable to a case in which upstream wireless communication is relayed from the mobile station UE (transmitting device) to the base transceiver station BTS (receiving device).

Further, the invention is also applicable to a case in which wireless communication is relayed between communication devices without using the base transceiver station BTS. Examples of this wireless communication include ad-hoc communication and multi-hop communication.

The wireless relay device and a wireless relay method according to an aspect of the embodiments is capable of reducing the capacity of a buffer that temporarily stores data to be relayed and causing communication of high-priority data not to be delayed, when the data is relayed wirelessly from a transmitting device to a receiving device.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless relay device that relays relay signals from a transmitting device to a receiving device by wireless communication, comprising:
   a retransmission buffer that temporarily stores a part of the relay signals to retransmit the part of the relay signals according to a retransmission request from the receiving device; and
   a buffer control unit that compares priority of a first relay signal received from the transmitting device and priority of a second relay signal stored in the retransmission buffer, and controls the buffer (i) to remove the second relay signal from the retransmission buffer and to store the first relay signal in the retransmission buffer in a condition that the priority of a first relay signal is higher than the second relay signal or (ii) not to store the first relay signal in the retransmission buffer in a condition that the priority of a first relay signal is lower than the second relay signal.

2. The wireless relay device according to claim 1, further comprising:
a retransmission requesting unit that requests the transmitting device to retransmit a relay signal, when the relay signal which is not stored in the retransmission buffer is retransmitted to the receiving device.

3. The wireless relay device according to claim 1, wherein the buffer control unit performs the control under a condition that a remaining buffer amount as an amount of relay signals newly storable in the retransmission buffer is equal to or less than a predetermined amount.

4. The wireless relay device according to claim 1, wherein the wireless relay device acquires, from the transmitting device, information serving as a priority comparison reference for the buffer control unit.

5. The wireless relay device according to claim 1, wherein classification of the information serving as the priority comparison reference for the buffer control unit is one of an attribute of the relay signal, the number of times the relay signal is retransmitted, a priority of the receiving device that receives the relay signal, and a communication quality between the relay device and the transmitting device that transmits the relay signal.

6. A wireless relay method in a wireless relay device that relays relay signals from a transmitting device to a receiving device by wireless communication and includes a retransmission buffer temporarily storing a part of the relay signals to retransmit the part of the relay signals according to a retransmission request from the receiving device, the wireless relay method comprising:
receiving a first relay signal from the transmitting device;
comparing priority of the first relay signal with priority of second relay signal stored in the retransmission buffer;
controlling the retransmission buffer (i) to remove the second relay signal from the retransmission buffer and to store the first relay signal in the retransmission buffer in condition that the priority of a first relay signal is higher than the second relay signal or (ii) not to store the first relay signal in the retransmission buffer; and
transmitting the first relay signal to the receiving device.

7. The wireless relay method according to claim 6, further comprising
requesting the transmitting device to retransmit a relay signal which is not stored in the retransmission buffer, when the relay signal is retransmitted to the receiving device.

8. The wireless relay method according to claim 6, wherein the buffer is controlled under a condition that a remaining buffer amount as an amount of relay signals newly storable in the retransmission buffer is equal to or less than a predetermined amount.

9. The wireless relay method according to claim 6, further comprising
acquiring information that serves as a priority comparison reference from the transmitting device when the priority of the first relay signal is compared with the priority of the second relay signal.

* * * * *